May 8, 1956 R. F. MALLINA 2,744,578
CODE TAPE PERFORATORS
Filed Nov. 2, 1951 2 Sheets-Sheet 1
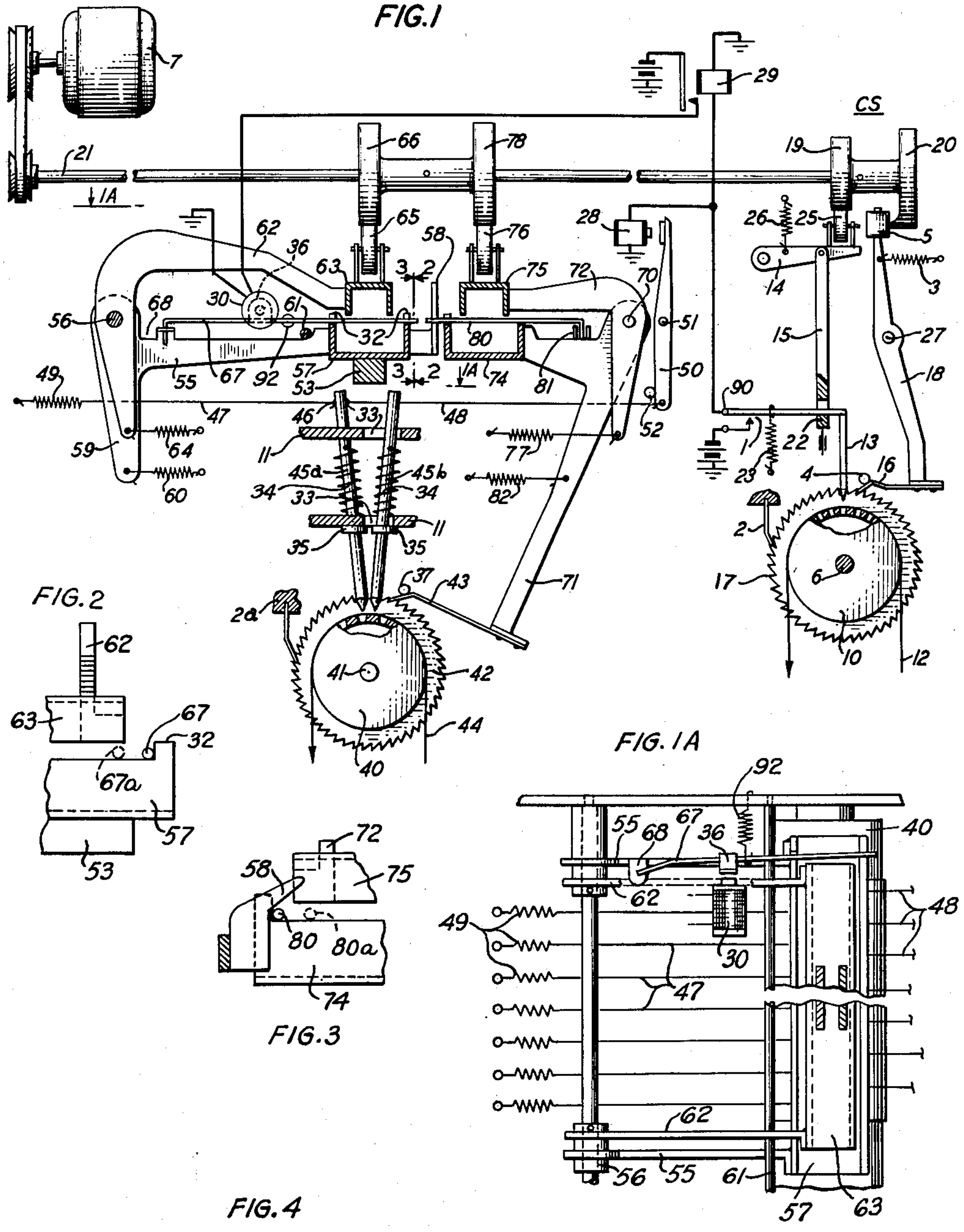
FIG. 1, FIG. 2, FIG. 3, FIG. 1A, FIG. 4
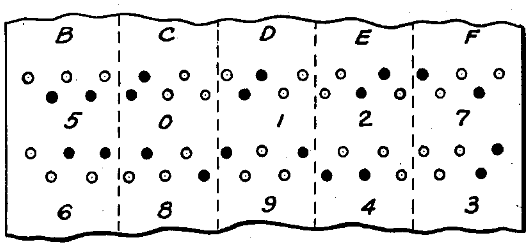
INVENTOR
R. F. MALLINA
BY
A. F. Kane
ATTORNEY

CODE TAPE PERFORATORS

Filed Nov. 2, 1951 2 Sheets-Sheet 2

INVENTOR
R.F. MALLINA
BY
A. F. Kane
ATTORNEY

United States Patent Office 2,744,578
Patented May 8, 1956

2,744,578

CODE TAPE PERFORATORS

Rudolph F. Mallina, Hastings on Hudson, N. Y., assignor to Bell Telephone Laboratories, Incorporated, New York, N. Y., a corporation of New York Application November 2, 1951, Serial No. 254,524

8 Claims. (Cl. 164—115)

This invention relates to code sorting systems and particularly to tape perforating devices used in sorting systems of the type in which coded entries indiscriminately recorded on a primary recording medium are caused to be selectively reproduced in orderly sequence on the recording media of a plurality of tape reperforators under the control of a common code sensing device, or reader.

In a known system of the type defined above, a primary recording medium, such as a paper tape, upon which perforation patterns symbolizing numerically identified items have been recorded is explored by the sensing fingers of the code sensing device, or reader, and as the reader fingers encounter perforations in the tape, corresponding punches or perforating pins in each of ten tape reperforators are prepared for operation to reproduce on individual paper tapes the perforation patterns encountered by the reader fingers. Each of the ten tape reperforators is differently preconditioned to detect a particular one of the ten digital patterns of which a numerically identified item may consist and to perform a tape perforating operation only when the item sensed by the reader contains the digital pattern the reperforator is preconditioned to detect. Means common to all the reperforators is provided whereby each reperforator is rendered selectively operative to reproduce a reader-sensed item which contains its corresponding characteristic digital pattern only when the said pattern occupies a particular digital position. Thus it is possible with such an organization of apparatus to reproduce on individual reperforator tapes and in orderly sequence, a multiplicity of coded items indiscriminately recorded on a primary tape. In the system briefly described and which is disclosed in my copending application, Serial No. 635,355, filed December 15, 1945, now Patent 2,576,844, granted November 27, 1951, the control exercised by the code sensing device, or reader, over the ten reperforators and the selectivity of operation thereof are attained wholly through mechanical means.

It is the object of this invention to provide an improved system of code sorting of the type disclosed in the above-identified copending application and to otherwise simplify the tape reperforators employed in such a system.

The attainment of this object is made possible by the use of a novel design of tape perforator, or reperforator, the selection of which and its preparation for operation to reproduce coded items sensed by a code sensing device are controlled by the code sensing device through the media of electromagnetically operated devices and the actual code reproducing, or punching operation is controlled through mechanically controlled instrumentalities.

In accordance with a particular feature of the invention each punch, or perforating pin of the reperforator is rendered individually responsive to the control of a corresponding sensing finger of a code sensing device through the medium of an electromagnetically operated code lever. More particularly, the reperforator code levers which individually prepare corresponding perforator pins for operation are individually controlled by code magnets which, in turn, are directly controlled electrically by the sensing fingers of the code sensing device, whereby the operation of groups of code sensing fingers in sensing particular code patterns is reflected to corresponding reperforator code levers and therefore, to corresponding reperforator punch pins. In this manner information recorded in code on a recording medium explored by a code sensing device is relayed to the reperforator through electromagnetically operated means controlled by the sensing fingers of the code sensing device.

Another feature of the invention contemplates the selection of the reperforators, in accordance with particular digital code patterns encountered by the sensing fingers of the sensing device, through the media of electromagnetically controlled means. More particularly, each of a plurality of reperforators is provide with a select magnet which, when operated under the control of the code sensing device in accordance with a particular code pattern encountered thereby, serves to render the prepared punch pins of the reperforator operable by the reperforator punch pin operator, or hammer. The punch pin operator, or hammer of the reperforator of this invention is normally in uncoupled relation to a cam-operated follower so that, while the follower responds continuously to the control of a continuously operating cam, the punch pin operator normally remains stationary. When the reperforator select magnet is operated in response to the sensing of a particular code pattern by the sensing device, it functions to mechanically couple the punch pin operator to the cam follower thereby rendering the punch pin operator, or hammer, operable by the rotating cam.

A related feature of the invention resides in a control circuit comprising a group of translating relays controlled directly by the sensing fingers of the code sensing device, which recognize and interpret the various code patterns by which the digits of a multidigit number are symbolized, to selectively control the electromagnetically operated coupling means of the reperforator in accordance with a particular digit-symbolizing code pattern.

Another feature of the invention resides in a novel method of and means for controlling the tape feed or stepping of the reperforator tape drum. A drum-stepping, or indexing lever is normally in uncoupled relation to a cam follower which cylically responds to a continuously operating cam and is mechanically coupled thereto by means directly under the control of the reperforator punch pin operator, or hammer, so that during the operation of the hammer the drum-stepping lever is effectively coupled to the cam follower to be operated thereby under control of the continuously operating cam. When thus operated, the drum-stepping lever disengages a stepping pawl from a ratchet associated with the tape drum and prepares it for reengagement with a succeeding tooth of the ratchet under the joint control of the cam and a coil spring. This reengagement of the stepping pawl with the ratchet which results in advancing the tape drum one step takes place after the reperforator punch pins have been withdrawn from the tape after having performed a perforating operation thereon.

These and other features of the invention will be readily understood from the following detailed description when read with reference to the accompanying drawings, in which:

Fig. 1 is a structural schematic view, partly in section, of a reperforator embodying the features of the invention and of a code sensing device, or reader, which controls the reperforator. In this figure, the electrical controls exercised by the sensing fingers of the code sensing device are shown schematically in that a single spring contact is illustrated as controlling both the code magnets and the select relays, the latter being represented by a single relay 29. Actually and as indicated in Fig. 5, each sensing finger controls a pair of spring contacts and the select relays 29 are five in number;

Fig. 1A is an enlarged plan view of a portion of the mechanism shown in Fig. 1, illustrating particularly the perforator select finger and the elements which control its movement;

Fig. 2 is an enlarged fragmentary detail view taken along the line 2—2 of Fig. 1, looking in the direction of the small arrows. In this figure the normal and alternate positions of the select finger, or interponent member which is controlled by the reperforator select magnet to couple the punch pin operator to the cam follower, are indicated;

Fig. 3 is an enlarged fragmentary detail view taken along the line 3—3 of Fig. 1, looking in the direction of the small arrows. In this view the interference, or interponent member and its associated camming device which cooperate in coupling the indexing, or stepping lever to its cam follower are shown in their normal and operated positions.

Fig. 4 illustrates a section of tape provided with perforations corresponding to the five-digit numbers 50127 and 68943.

Figure 5:
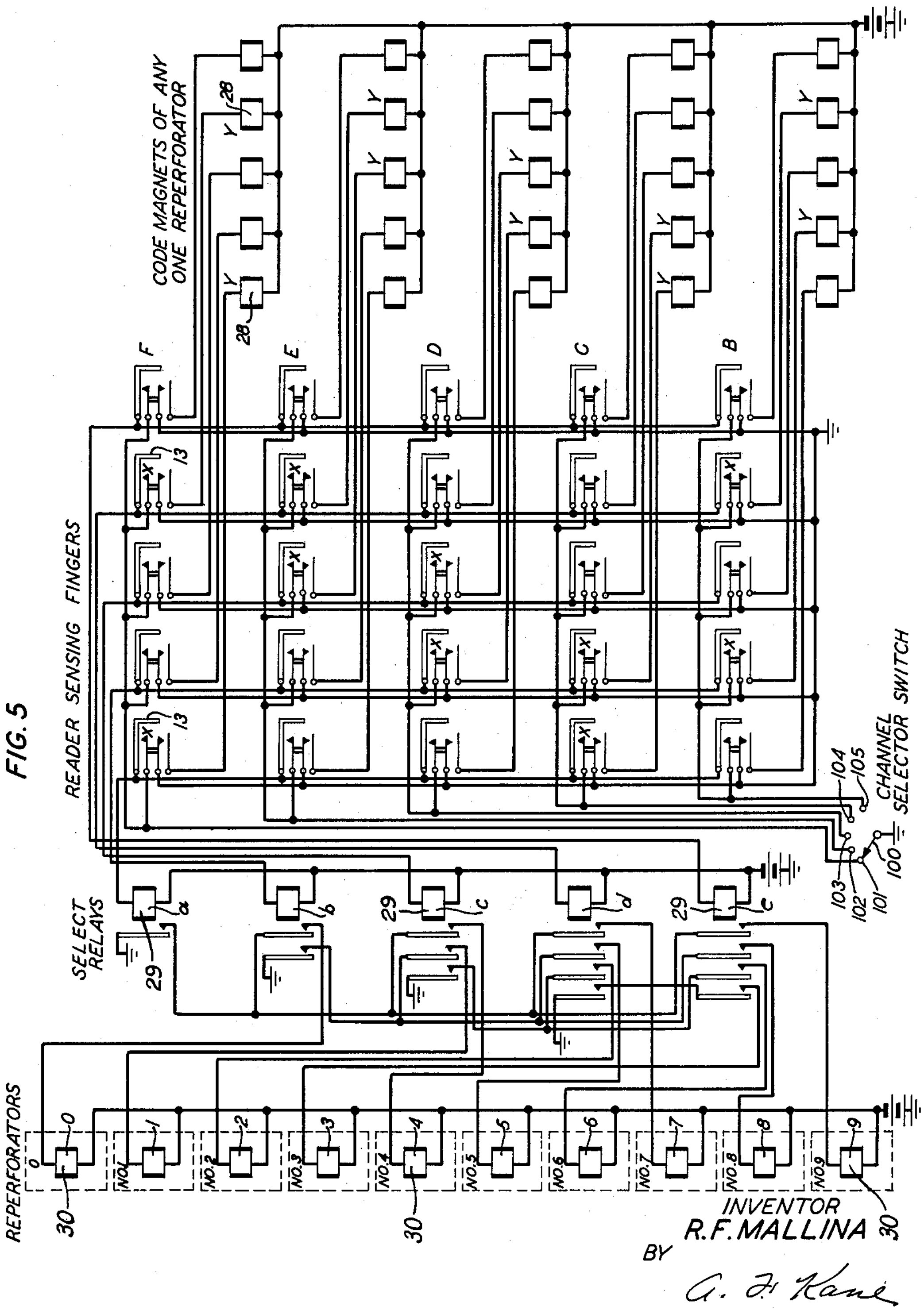
Fig. 5 is a circuit schematic drawing illustrating the manner in which the code magnets and select magnets of the reperforators are selectively controlled by the sensing fingers of the code sensing device, or reader.

In Fig. 1 there is illustrated a common drive shaft 21 which is continuously rotated at a uniform speed by a motor 7. This shaft is hereinafter referred to as the cam shaft in that it carries the reader cams 19 and 20 and two cams 66 and 78 of each of ten reperforators. The cam shaft is thus common to all of ten reperforators of the type disclosed in Fig. 1 and to a single code sensing device, or reader CS which functions to selectively control the reperforators in accordance with code perforations appearing on a primary tape 12 and encountered by code sensing fingers 13 of the reader during a sensing operation.

The reperforator disclosed in Fig. 1 is herein characterized as a two-cam type in that separate cams are employed in controlling the actual tape perforating operation and the stepping of the tape-bearing drum. These cams 66 and 78 are shown as a single structure in Fig. 1. It is obvious that these two operations must be performed in a definite time sequence. The cams 66 and 78 are designed to insure this necessary sequence of operations.

Each reperforator is, of itself, a complete unit and consists essentially of a tape-bearing drum, a plurality of tape-perforating punch pins, a cam-controlled punch pin operator assembly, a cam-controlled stepping assembly for the tape drum, and a code lever for each punch pin. In the present description it is assumed that the coded items which appear as perforation patterns on a primary tape and are to be selectively reproduced on the tapes of the reperforators are five-digit numbers and that each digit is symbolized by two perforations out of a fixed pattern of five in accordance with the well-known "two-out-of-five" code and as illustrated in Fig. 4. Thus, it is evident that to accommodate such five-digit numbers each reperforator must include twenty-five punch pins and a corresponding number of code levers.

In order to simplify the drawing only one code lever 50 is illustrated. In actual practice the reperforator includes a group of twelve levers located to the right of the structure and a group of thirteen levers situated at the left. The levers of each group are mounted for limited rotation on a horizontal shaft such as shaft 51. The upper end of each code lever 50 is suitably equipped so as to render it responsive to the energization of a corresponding electromagnet 28. There being twenty-five levers 50, there will be twenty-five code magnets 28 each located with respect to its corresponding lever in the manner illustrated. To the lower end of each code lever 50 there is secured one end of a code wire 48 which connects with an extension 47 thereof by way of an insert 46 which is fitted into a slot in the upper end of a corresponding punch pin 45*a*. The left end of code wire section 47 is secured to one end of a coil spring 49, the other end of which is suitably anchored to the reperforator frame. There is one code wire and also one coil spring 49 for each punch pin such as 45*a* and 45*b*. It is understood of course that the coil springs 49 associated with punch pins such as pins 45*b* are located at the right and the corresponding code levers 50 at the left. Normally, the code levers 50 are held in contact with a stop rod such as rod 52 under the influence of their corresponding springs 49.

The twenty-five punch pins 45*a*, 45*b* are spring mounted between two shelf-like plates 11 which are provided with suitable slots 33 which freely accommodate the pins and permit them to be moved under the action of their corresponding code wires. The pins are arranged in two groups, one consisting of twelve pins 45*a* normally inclined to the left in the drawing and another of thirteen pins 45*b* inclined to the right. Those pins which incline to the left are controlled by the code levers located on the right of the structure whereas those which incline to the right are controlled by the code levers located on the left side of the assembly. The shank or pin portion located between the two plates 11 is encircled by a coil spring 34 which tends to urge the pin upward. To maintain the pins in the position illustrated each is provided with a stop ring 35 which abuts the under surface of the lower plate 11.

A horizontal shaft 41 disposed immediately below the lower cone-shaped ends of the punch pins supports a tape-bearing drum 40 which may be of any suitable design such, for example, as shown in the copending application, Serial No. 588,401, filed April 14, 1945, now Patent 2,583,086, granted January 22, 1952 to W. W. Carpenter. The drum, or cylinder 40 is mounted on the shaft 41 for step-by-step rotation under control of a stepping pawl 43 which cooperates with a ratchet wheel 42 fixed to one end face of the drum. A paper tape 44 is fed over the drum 40 and is adapted to be perforated by the pins 45*a* and 45*b* when the pins, after having been selectively set by their corresponding code levers 50, are driven downward into the tape by means of a punch pin operator.

The punch pin operator assembly comprises a pair of substantially horizontal levers 55 which at the inwardly projecting ends thereof support an integrally formed U-shaped, or channel member 57 which is disposed in superposed spaced relation to the punch pins 45. The levers 55 are rotatably supported by a horizontal shaft or rod 56 and are provided with depending integrally formed arms 59 to each of which one end of a coil spring 60 is secured, the other end of which is suitably anchored to the reperforator frame. The spring 60 serves to normally exert a counter-clockwise pull on the lever 55 and to thereby maintain it normally in engagement with a common stop rod 61. The U-shaped hammer 57 of the punch pin operator supports, on its under surface, a resilient pad 53 which, when the levers 55 are operated in a manner to be hereinafter described, engages the upper ends of those punch pins which previously have been positioned therebeneath incident to the operation of corresponding code levers 50.

The punch pin operator is actuated by means of a lever, or cam follower 62 and a coupling select finger 67 under control of cam 66. The lever 62, at its outer end supports an inverted U-shaped integral member 63 which supports a roller 65 on its upper face. Through its associated roller 65, the lever 62 responds to the control of cam 66. A spring 64 serves to maintain the roller 65 and the cam 66 in constant peripheral contact.

The select finger is an elongated rod which is pivotally mounted in any suitable manner at 68 on the lever 55 and extends radially from its pivot support so as to span the two edges of the U-shaped hammer 57 near its forward end as shown in Fig. 2. In this position the rod clears the forward end of the inverted U-shaped member 63 so that the lever 62 is free to follow the operations of cam 66 without interference from the rod. The lever 62 therefore, is free to operate under control of cam 66 without influencing the punch pin operator lever 55. Intermediate its extremities the select finger 67 carries a magnetic element 36 which, actually, is the armature of a select magnet 30. When the magnet 30 is deenergized, the select finger 67 is free to assume its normal position, shown in full line in Fig. 2, under control of suitable restoring means, such as springs 92, in which position it abuts projections such as 32 which are integrally formed on the forward end of the hammer 57. When the magnet is energized and the armature 36 is attracted to its operated position, the select finger 67 is moved to its alternate position which is illustrated by the broken outline 67*a* in Fig. 2. In this position the finger is interposed between the edges of the U-shaped members 57 and 63 so that any downward travel of member 63 is transmitted to the member 57 through the select finger 67. Thus, under certain control conditions exercised by the reader CS and manifested by the energization of the select magnet 30, the punch pin operator becomes effective to drive previously conditioned punch pins 45*a*, 45*b* into the tape 44. In this manner the tape 44 is perforated in a pattern determined by the combination of punch pins operated.

Extending to the right of the outer flange of the U-shaped member or hammer 57 near its forward end and integrally formed therewith is a camming element 58 which cooperates with an interference or interponent member or finger 80 in controlling the operation of a tape drum stepping or indexing mechanism. A stepping lever 71 which is rotatably mounted on a horizontal shaft 70 comprises a horizontally disposed arm which terminates in the U-shaped portion 74 and the angularly depending lever arm 71 which carries at its outer end the stepping pawl 43. The interponent finger 80 is pivotally mounted on the lever 71 at 81 and projects to the left therefrom so as to span the edges of the vertical sides of the U-shaped member 74 near its forward end. The finger 80 is pretensioned to normally maintain it against a lip on the forward end of member 74 as shown in Fig. 3, in which illustrated position the projecting end of the finger 80 is in contact with the sloping edge of cam 58. In this position the finger 80 is located beyond the forward end of an inverted U-shaped member 75 formed integrally with the lever 72. On the upper surface of the member 75 a roller 76 is supported which is held in constant peripheral engagement with the cam 78 through the action of spring 77.

The lever 72 is pivotally mounted on the shaft 70 and responds to the control of cam 78 when the latter is rotated. This response results in a reciprocating movement of the member 75. While the finger 80 is located in its normal illustrated position the levers 72 and 71 are in uncoupled relation so that the latter remains stationary even though the former responds to the control of cam 78. However, when the punch pin hammer 55 is moved clockwise about the support 56 in performing its punch operating function, the cam 58 moves with the punch pin operator and in so doing actuates the interponent finger 80 to its alternate position. In this position, which is indicated in broken outline in Fig. 3, the finger 80 is located in the line of travel of the inverted U-shaped member 75 so that as the latter is moved counter-clockwise about its support 70 under the action of cam 78, the lever 71 experiences a similar movement. Thus the stepping pawl 43 is withdrawn from engagement with the ratchet wheel 42 and assumes a position in which its outer end is located opposite the next succeeding tooth of the ratchet. After the punch pin hammer 55 has completed its punching operation and restores to normal under the joint control of cam 66 and spring 60, the cam 78 permits the lever 71 to return to normal under control of spring 82 so that the pawl 43 engages the next tooth on the ratchet wheel 42 and advances the drum 40 one step. This clockwise movement of lever 71 is arrested when the pawl 43 engages the stop 37. It is to be understood that upon return to normal of the punch pin hammer the operated punch pins 45*a*, 45*b* restore to normal under the action of their respective coil springs 34 and are clear of the drum 40 before the pawl 43 functions to advance the drum.

As previously indicated the code levers 50 of the reperforator are operated by individual code magnets 28 which, in turn, are directly controlled by the sensing fingers 13 of the sensing device CS. The code sensing device, or reader comprises a tape drum 10 which accommodates the primary tape 12, twenty-five sensing fingers 13, a cam 19 and cam follower 14 which controls the operation of the sensing fingers, and an indexing mechanism comprising the stepping pawl 16, its supporting lever 18 and the cam 20.

The perforated tape drum or cylinder 10 of the reader is rotatably supported on the horizontal shaft 6 and may be of any suitable design. Disposed immediately above the drum 10 is a series of twenty-five sensing fingers 13, only two of which appear in Fig. 1, each of which consists of a horizontal portion and an integral vertically depending leg. The fingers 13 are individually, pivotally mounted at 90 in any suitable manner and are arranged so that the ends of the depending legs thereof are in horizontal alignment and parallel to the axis of shaft 6. The fingers are supported in their normal illustrated positions by means of a cross-bar 22 which is integrally associated with two connecting rods, only one of which is shown at 15. Each finger 13 is pretensioned downward against the bar 22 by means of an individual spring 23 so that it has a normal tendency to move in the direction of the drum 10. Each connecting rod 15 is pivotally secured to a lever 14 which, in turn, is pivotally mounted on the reader framework. The lever 14 illustrated, supports a roller 25 on its upper edge and with the roller 25 constitutes a follower for cam 19. The cam 19 and roller 25 are maintained in constant peripheral engagement by spring 26 and is so designed that for each revolution thereof the connecting rods 15 and bar 22 are moved downward and then restored to their normal positions. It is during the downward movement of the connecting rod that the sensing fingers explore the primary tape for code perforations as will be described more fully hereinafter.

The cam 20 shown integral with cam 19 and mounted on shaft 21 controls the stepping lever 18 which is rotatably mounted on a horizontal shaft 27. A roller 5 is carried on the upper end of lever 18 and is held in continuous peripheral engagement with cam 20 by spring 3. At its lower end the lever 18 supports the stepping pawl 16 which serves to drive the ratchet 17 and therefore, the drum 10 to which the ratchet is fixed, in a step-by-step manner. The fixed pawl 2 serves to accurately position the drum 10 and to preclude clockwise rotation thereof. The fixed pawl 2′ serves the same purpose with respect to the reperforator drum 40.

*Reader operation*

The reader or sensing device CS operates in the following manner: The reader tape 12 is propelled by the reader drum 10 in consequence of the operation of the stepping lever 18 and its associated pawl 16. As a result of each stepping operation of the drum two rows of code perforations on the tape 12 are presented to the exploring ends of the two rows of sensing fingers 13. As previously indicated there are twenty-five sensing fingers 13 embodied in the reader CS arranged in two rows of twelve and thirteen fingers, respectively. One such pin is shown in Fig. 1. Also, the code tape 12 includes five channels, B, C, D, E and F (Fig. 4) each of which provides five possible positions in which perforations may appear. As shown in Fig. 4 the five possible perforation positions in each channel are staggered to effect two lines of three and two positions, respectively.

In the position of the reader illustrated it will be assumed that two rows of perforations comprising five groups of two perforations (each group symbolizing a particular digit as illustrated in Fig. 4) are located immediately below the exploring ends of the sensing fingers 13 and that, by means of the motor 7 and shaft 21, the reader cams 19 and 20 are rotating.

As the cam 19 rotates, it forces the connecting rod 15 downward during the first portion of its cycle of operation. All twenty-five sensing fingers 13 thus are freed to respond to the influence of their respective springs 23 and accordingly they are moved in the direction of the drum 10. All but ten of the fingers encounter imperforate portions of the tape 12 and are arrested in their downward travel thereby. The remaining ten fingers continue their downward travel and the exploring ends thereof pass through the code perforations in the tape 12. Thus ten sets of contacts 1 are operated by their corresponding sensing fingers. The results of the closure of these ten contact sets will be described in detail hereinafter.

The contour of cam 20 relative to that of cam 19 is such that as the sensing fingers 13 enter the perforations in the tape, the lever 18 is moved in a counter-clockwise direction under the action of cam 20 and against the restraining influence of spring 3. The pawl 16 is thus disengaged from the ratchet 17 and is located with its operating end in position to engage a different tooth of the ratchet when the cam 20 permits the spring 3 to rotate the lever 18 in a clockwise direction. This occurs just as the operated perforating pins are withdrawn from the drum apertures and under the action of spring 3 the lever 18 through the pawl 16 drives the drum 10 counter-clockwise to the next position. The stop 4 insures stopping of the drum in correct position. The code tape 12 is thus stepped around with the drum so that the next two rows of code perforations thereon are presented to the sensing fingers. The withdrawal of the punch pins is effected when the cam 19 permits the connecting rod 15 to be raised under the action of spring 26.

*Reperforator operation*

In response to the closure of ten sets of contacts by the sensing fingers 13 of the reader CS ten corresponding code magnets 28 in the reperforator are operated as are also two select relays 29. How these magnets and relays are controlled by the reader sensing fingers will be set forth in the description of Fig. 5. For purposes of the present description it will be assumed that a particular pair of relays 29 operates together with ten code magnets 28 in response to the operation of the sensing fingers 13 and that the operation of the particular pair of relays 29 results in the energization of the select magnet 30 of the reperforator shown in Fig. 1.

Each code magnet 28 operates a corresponding code lever 50 which, in turn, positions a corresponding punch pin 45*a*, 45*b* so that its upper end comes within the line of travel of the hammer pad 53. Thus there are ten punch pins prepared for operation and each operated punch pin corresponds to a particular one of the reader sensing fingers 13 which has found a perforation in the primary tape 12.

The energization of select magnet 30 causes the select finger 67 to assume its alternate position in which it is located directly under the inverted U-shaped member 63 of the punch pin hammer assembly, thereby effectively coupling the hammer with the actuating lever 62. As the cam 66 rotates, it functions, subsequent to the operation of the select finger 67 to its alternate position, to move the lever 62 in a clockwise direction about the shaft 56. In its downward travel the inverted U-shaped member 63 engages the select finger so as to drive it and the U-shaped hammer 57 downward. The pad 53 thus strikes the upper ends of the ten previously set punch pins 45 causing them to move in the direction of the drum 40. The conical ends of these punch pins thus perforate the tape 44. The perforation patterns which are produced on the tape 44 in this manner correspond to the perforation patterns which were encountered by the sensing fingers 13 of the code sensing device CS.

During the downward travel of the hammer 57 the cam 58 moves the interponent finger 80 under the inverted U-shaped portion of lever 72 of the indexing assembly as shown in Fig. 3. Thus the two levers 71 and 72 of the indexing assembly are effectively coupled. As the cams 66 and 78 continue to rotate, the latter drives the lever 72 in a counter-clockwise direction, the inverted U-shaped portion 75 thereof engaging the interponent member 80 and thereby driving the U-shaped member 74 downward. Thus the stepping lever 71 is rotated in a counter-clockwise direction about shaft 70 and the pawl 43 is moved out of engagement with the ratchet wheel 42 and its operating end assumes a position opposite a lower point on the toothed periphery of ratchet wheel 42.

As the cams 66 and 78 continue to rotate, the former permits the levers 62 and 59 of the hammer assembly to restore to normal under the influence of their respective springs 64 and 60. As the hammer clears the upper ends of the operated perforating pins 45*a*, 45*b*, their respective springs 34 function to withdraw the pins from the tape 44 and, since the code magnets 28 are now deenergized the springs 49 restore the pins to their normal positions.

As the punch pins 45 return to normal position the cam 78 permits the lever 72 to restore under the action of spring 77. The stepping lever 71 therefore, is enabled to respond to the influence of spring 82 so that it moves in a clockwise direction about its support 70. This movement of lever 71 causes the stepping pawl 43 to reengage the ratchet 42 at a point sufficiently low on the toothed periphery thereof to cause the drum 40 to be rotated to the next recording position. The drum is arrested in this position by the reengagement of the pawl 43 with the stop 37. Thus a complete cycle of operations has been completed and the reader and reperforator have resumed their respective illustrated conditions. It is to be understood that the various reader and reperforator operations described above are performed in a definite time sequence which is determined by the relative contours of cams 19, 20, 66 and 78.

*Gang operation of reperforators*

The manner in which a gang of ten reperforators of the type disclosed is controlled by a single code sensing device will now be described with particular reference to Fig. 5 and incidental reference to Fig. 1. The center portion of Fig. 5 constitutes a schematic showing of twenty-five code sensing fingers 13 of the reader or sensing device CS. As previously indicated each finger controls a set of two make contacts which, for descriptive purpose, are hereinafter referred to as upper and lower contacts. The lower make contacts associated with each sensing finger 13 are individually allocated to a particular code magnet 28 (Fig. 1) in each reperforator. The twenty-five code magnets of any one reperforator are shown at the right of the sensing fingers in Fig. 5. The operation of any one sensing finger results in the energization of a corresponding code magnet in each of ten reperforators over obvious circuits. Immediately to the left of the sensing fingers 13 in Fig. 5 are shown five control or select relays *a*, *b*, *c*, *d* and *e*, each of which is controlled by the upper contacts of the reader sensing fingers in a manner to be described presently. These relays in turn selectively control the operation of the select magnets 30 (Fig. 1) of the ten reperforators 0, 1, 2, . . . 9 schematically indicated at the extreme left of Fig. 5.

The code employed in the present system, as previously indicated, is the well-known "two-out-of-five" code wherein each element or character of an entry appearing on the primary tape 12 (Fig. 1) is symbolized by perforations located in two-out-of-five possible positions occupying two transverse lines on the tape. Where the code entries correspond to five-digit numbers (Fig. 4) each of the five digital positions on the tape is defined as a channel, such as the units channel, the tens channel, and so on. Each digital position or channel has five transverse points at which perforations may appear in combinations of two perforations to differently symbolize each of the digits 1 to 9, and zero. It is well known that ten different combinations of two perforations each may be derived from a fixed pattern of five.

The ten reperforators schematically indicated at the left of Fig. 5 are respectively designated the zero reperforator, the No. 1 reperforator, . . . . and the No. 9 reperforator and each is arranged to respond to the control of the reader CS only when the sensing fingers of the latter encounter a perforation pattern which symbolizes a particular digit. For example, the zero reperforator will respond to reproduce a coded item on tape 12 sensed by the reader CS only when the item contains the perforation pattern which symbolizes zero; the No. 1 reperforator will respond to reproduce a coded item only when the sensed item contains the perforation pattern symbolizing the digit 1; and so on. Furthermore, each reperforator may be rendered selectively operable to reproduce a coded item only when the item embodies the particular digital pattern in a particular digital position. This is accomplished by means of a manually operable switch 100 which may be moved manually into engagement with any of five contacts 101, 102, 103, 104 and 105. This switch is defined as a "channel selector switch" in that it determines the channel in which the controlling digital pattern must appear to effect the operation of the correspondingly identified reperforator.

For clarity of disclosure the twenty-five sensing fingers of the reader CS are arranged in five horizontal rows in Fig. 5, each row comprising five fingers. The top row of fingers serves the units channel F; the second row serves the tens channel E; the third row serves the hundreds channel D; the fourth row serves the thousands channel C; and the bottom row serves the ten thousands channel B. It will be observed that each of the contacts of the channel selector switch 100 corresponds to a particular group of five reader fingers so that each such contact is actually allocated to a different one of the five digital channels or positions of a five-digit number or entry which may be sensed by the reader fingers.

The position of switch 100 determines which of the five groups of sensing fingers is to be effective in controlling the operation of the select relays *a*, *b*, *c*, *d*, and *e*, and therefore determines in which of the five channels a sorting operation is to be performed. When the switch 100 is in engagement with contact 101, the top row of sensing fingers is enabled to control the select relays and the sorting operation is performed in the units channel F; when the switch 100 is in engagement with contact 102, the second row of sensing fingers is enabled to control the select relays and the sorting operation is performed in the tens channel E, and so on.

In order to more fully describe the operation of the system illustrated it will be assumed that the sensing fingers 13 of the code sensing device CS encounter, on the reader tape 12, the digital code patterns which symbolize the number 50127.

When the digital patterns symbolizing the number 50127 are encountered during a sensing operation by the reader there will be operated two sensing fingers 13 in each group of five allocated to the five different digital positions. In Fig. 5 the sensing fingers which are operated under this condition are designated by the small letter *x*. As a result of these operations corresponding code magnets 28 in each of the ten reperforators will be energized and operated. The operated code magnets of one of the reperforators are designated by the small letter *y* in Fig. 5. The operated code magnets, as described hereinbefore, function to prepare corresponding perforating pins 45 in each of the reperforators for operation. Thus, each reperforator is conditioned to reproduce, on its tape 44, code patterns symbolizing the number 50127.

It will be assumed for descriptive purpose that the sorting operation is to be performed in the units channel F and that the switch 100 has been set, accordingly, on the switch contact 101. It will now be observed that only the operated sensing fingers 13 of the top row which are allocated to the units channel F are effective to control the operation of the select relays *a*, *b*, *c*, *d*, and *e* and that relays *a* and *d* of this group operate. With these relays operated, select magnet 7 operates in an obvious circuit. Select magnet 7 is individual to the No. 7 reperforator and, when operated, functions to effectively couple the hammer 55 and the cam follower 62 of the No. 7 reperforator thereby causing the hammer 55 thereof to respond to the control of cam 66 and to drive the selected punch pins 45*a*, 45*b* into the tape 44 of the reperforator. Thus the code patterns which symbolize the number 50127 and were sensed by the sensing fingers of the reader CS are reproduced on the tape of the No. 7 reperforator. Since all other select magnets are unoperated, no reperforator other than the No. 7 reperforator will perform a tape perforating operation. When the sensing fingers of the code sensing device restore, the energizing circuits of the code magnets 28 and of the select relays *a* and *d* are opened. With relays *a* and *d* deenergized the select magnet of the No. 7 reperforator is released.

To carry the description further it will be assumed that the sorting operation is to be performed in the tens channel E instead of the units channel F as described. In this case the switch 100 is moved into engagement with contact 102 which is individual to the second row of sensing fingers allocated to the tens channel. It is apparent that under this condition, select relays *c* and *d* operate and, in turn, operate select magnet 2 which is identified with the No. 2 reperforator. The No. 2 reperforator would then operate, to the exclusion of all other reperforators, to reproduce on its tape the code perforations which symbolize the number 50127.

Had sorting been undertaken in the hundreds channel D switch 100 would have been actuated to contact 103 to cause the operated sensing fingers 13 of the third row to operate select relays *b* and *c*. These relays, operated, cause the select magnet 1 of the No. 1 reperforator to operate and to enable the No. 1 reperforator for operation to reproduce, on its tape, the code symbols which characterize the number 50127.

Sorting in the thousands column C is effected by actuating switch 100 to contact 104 whereupon the operated sensing fingers of the fourth row become effective and cause select relays *a* and *b* to operate. These relays, in turn, operate select magnet 0 of the zero reperforator. The zero reperforator then functions to reproduce the perforation patterns corresponding to number 50127.

It is apparent from the foregoing descriptions that the reperforator of this invention combines both electrically and mechanically controlled means in reproducing, on a code tape, the code entries recorded on the tape of the code sensing device. More particularly, the setting of the perforating pins of the reperforator is effected through the medium of electrically responsive means under control of the sensing fingers of the sensing device, as is also the selection of the reperforator, whereas the actual perforating operation of the reperforator and the indexing thereof are effected through the medium of mechanical means controlled by a constantly rotating cam.

What is claimed is:

1. In combination, a code sensing device comprising a tape bearing code perforations patterned to symbolize the characters of a multicharacter entry, and sensing fingers for exploring said tape for character-symbolizing code patterns, a tape perforator having punch pins individually corresponding to the sensing fingers of said code sensing device, electromagnetically operated means controlled by the sensing fingers of said code sensing device for preparing corresponding punch pins for operation in accordance with the character patterns of an entry encountered by the said sensing fingers, an operator individual to said perforator for actuating the prepared punch pins, continuously operating camming means for continuously operating said punch pin operator and normally ineffective to do so, and electromagnetically operated means controlled by the sensing fingers of said code sensing device in accordance with a particular character pattern encountered thereby for rendering said camming means effective to operate said punch pin operator.

2. In combination, a code sensing device comprising a tape bearing code perforations patterned to symbolize the characters of a multicharacter entry, and sensing fingers for exploring said tape for character-symbolizing code patterns, a tape perforator comprising punch pins individually corresponding to the sensing fingers of said code sensing device, electromagnetically operated means controlled by the sensing fingers of said code sensing device in accordance with the character patterns of an entry encountered thereby for individually preparing corresponding punch pins for operation, a continuously operating cam, a punch pin operator normally in uncoupled relation to said cam, and electromagnetically operated means controlled by the sensing fingers of said code sensing device in accordance with a particular one of the character patterns encountered thereby for coupling said punch pin operator to said continuously operating cam.

3. In combination, a code sensing device comprising a tape bearing code perforations patterned to symbolize the characters of a multicharacter entry, and sensing fingers for exploring said tape for character-symbolizing code patterns, a tape perforator comprising a tape drum carrying a tape, indexing means for said tape drum, punch pins located in superposed spaced relation to the tape on said drum and individually corresponding to the sensing fingers of said code sensing device, electromagnetically operated means controlled by the sensing fingers of said code sensing device in accordance with the character patterns of an entry encountered thereby for preparing corresponding punch pins for operation, continuously operating camming means, a punch pin operator normally in uncoupled relation to said camming means, electromagnetically operated means controlled by the sensing fingers of said code sensing device in accordance with a particular character pattern encountered thereby for coupling said punch pin operator to said camming means whereby said operator drives the prepared punch pins into said tape, and means controlled directly by said punch pin operator for conditioning said indexing means for operation by said camming means.

4. In combination, a code sensing device comprising a tape bearing code perforations patterned to symbolize the characters of a multicharacter entry, and sensing fingers for exploring said tape for character-symbolizing code patterns, a tape perforator comprising a tape drum carrying a tape, indexing means for said tape drum, a continuously operating cam for operating said indexing means and normally ineffective to do so, punch pins located in superposed spaced relation to said tape drum and individually corresponding to the sensing fingers of said code sensing device, a punch pin operator common to all said punch pins, electromagnetically operated means controlled by the sensing fingers of said code sensing device in accordance with the character patterns of an entry encountered thereby for aligning only corresponding punch pins with said operator for operation thereby, a second continuously operating cam for operating said punch pin operator and normally ineffective to do so, electromagnetically operated means controlled by the sensing fingers of said code sensing device in accordance with a particular character pattern encountered thereby for rendering said second cam effective to operate said punch pin operator whereby said operator drives the prepared punch pins into said tape, and means controlled directly by said punch pin operator for rendering said first cam effective to operate said indexing mechanism.

5. A tape perforator comprising a constantly rotating cam, a plurality of settable punch pins, a punch pin operator including a U-shaped member disposed immediately above said punch pins when said punch pins are set, means for setting said punch pins, a cam follower in constant engagement with said constantly rotating cam, said cam follower including an inverted U-shaped member disposed in vertical alignment with the U-shaped member of said punch pin operator and having the parallel arms thereof spaced differently from the parallel arms of said inverted U-shaped member whereby when said cam follower is actuated by said cam the inverted U-shaped member thereof moves freely within the U-shaped member of said punch pin operator to preclude the operation of said punch pin operator by said cam follower, a select finger pivotally mounted on said punch pin operator, and electromagnetically operated means for interposing said select finger between corresponding edges of said cam follower and of said punch pin operator whereby the movement of said cam follower effected by said cam is transmitted to said punch pin operator through said select finger to cause said punch pin operator to actuate said punch pins under control of said cam.

6. A tape perforator comprising in combination, a tape drum, indexing means for said tape drum, constantly operating camming means for operating said indexing means and normally ineffective to do so, punch pins disposed immediately above said tape drum, a punch pin operator, means including electromagnetically operated means for aligning certain of said punch pins with said punch pin operator, cam operated means normally in uncoupled relation to said punch pin operator, electromagnetically controlled means for coupling said punch pin operator to said camming means to cause said punch pin operator to be actuated thereby and to operate the aligned punch pins, and means including camming means formed integrally with said punch pin operator for rendering said constantly operating camming means effective to operate said indexing means.

7. In a tape perforator, a tape bearing drum, stepping means for said drum, a cam follower for operating said stepping means and normally in uncoupled relation thereto, a plurality of punch pins, a hammer for actuating said punch pins, means including electromagnetically operated means for aligning certain of said punch pins with said hammer, a cam follower for operating said hammer whereby said hammer strikes the aligned punch pins, camming means carried by said hammer, continuously rotating cams for operating said cam followers, and means controlled by said hammer-borne camming means incident to the operation of said hammer by its cam follower for coupling said stepping means with its cam follower.

8. A tape perforator camprising, in combination, a drum bearing a tape, punch pins disposed in superposed spaced relation to said drum, a common punch pin operator normally out of alignment with and adapted to drive said pins into said tape, electromagnetically controlled means for moving only selected ones of said punch pins into alignment with said common punch pin operator for operation thereby, a continuously rotating cam, a cam follower normally in uncoupled relation to said punch pin operator, and electromagnetically controlled means for coupling said cam follower to said punch pin operator.

(References on following page)

References Cited in the file of this patent

UNITED STATES PATENTS

| | | |
|---|---|---|
| 2,353,034 | Holt | July 4, 1944 |
| 2,558,476 | Carpenter et al. | June 26, 1951 |
| 2,581,184 | Goff | Jan. 1, 1952 |
| 2,583,086 | Carpenter | Jan. 22, 1952 |
| 2,595,889 | Ryffel et al. | May 6, 1952 |
| 2,609,050 | Roth | Sept. 2, 1952 |
| 2,652,116 | Mallina et al. | Sept. 15, 1953 |
| 2,669,304 | Carpenter | Feb. 16, 1954 |